United States Patent
Kitagawa et al.

(10) Patent No.: US 12,442,552 B2
(45) Date of Patent: Oct. 14, 2025

(54) AIR CONDITIONING CONTROL SYSTEM, AIR CONDITIONER, AND MACHINE LEARNING DEVICE

(71) Applicant: DAIKIN INDUSTRIES, LTD., Osaka (JP)

(72) Inventors: Keita Kitagawa, Osaka (JP); Youichi Handa, Osaka (JP); Takuya Kazusa, Osaka (JP); Takehiro Naoi, Osaka (JP); Asuka Kamio, Osaka (JP)

(73) Assignee: DIAKIN INDUSTRIES, LTD., Osaka (JP)

(*) Notice: Subject to any disclaimer, the term of this patent is extended or adjusted under 35 U.S.C. 154(b) by 328 days.

(21) Appl. No.: 17/671,500

(22) Filed: Feb. 14, 2022

(65) Prior Publication Data
US 2022/0170659 A1  Jun. 2, 2022

Related U.S. Application Data

(63) Continuation of application No. PCT/JP2020/031331, filed on Aug. 19, 2020.

(30) Foreign Application Priority Data

Aug. 23, 2019 (JP) .................... 2019-153118

(51) Int. Cl.
*F24F 11/63* (2018.01)
*G05B 19/042* (2006.01)

(52) U.S. Cl.
CPC ............ *F24F 11/63* (2018.01); *G05B 19/042* (2013.01); *G05B 2219/2614* (2013.01)

(58) Field of Classification Search
None
See application file for complete search history.

(56) References Cited

U.S. PATENT DOCUMENTS

| 9,020,647 B2 * | 4/2015 | Johnson | F24F 11/62 700/277 |
| 11,649,980 B2 * | 5/2023 | Chae | F24F 11/72 700/276 |

(Continued)

FOREIGN PATENT DOCUMENTS

| CN | 109631265 A | 4/2019 |
| EP | 3 657 088 A1 | 5/2020 |

(Continued)

OTHER PUBLICATIONS

International Search Report of corresponding PCT Application No. PCT/JP2020/031331 dated Oct. 27, 2020.

(Continued)

*Primary Examiner* — Howard Cortes
(74) *Attorney, Agent, or Firm* — GLOBAL IP COUNSELORS, LLP

(57) ABSTRACT

An air conditioning control system includes an air conditioner, a setting unit, a control unit and a learning unit. The air conditioner performs air conditioning in a room. The setting unit sets a first temperature and a second temperature. The first temperature is a target temperature for a first area in the room. The second temperature is a target temperature for a second area in the room. The control unit controls the air conditioner so that a temperature of the first area approaches the first temperature and a temperature of the second area approaches the second temperature. The learning unit learns control of the air conditioner so that the temperature of the first area approaches the first temperature and the temperature of the second area approaches the second temperature.

15 Claims, 13 Drawing Sheets

(56) References Cited

U.S. PATENT DOCUMENTS

| | | | |
|---|---|---|---|
| 2012/0174608 A1 | 7/2012 | Kumamoto et al. | |
| 2013/0259456 A1* | 10/2013 | Viswanathan | B25J 9/1697 |
| | | | 392/407 |
| 2014/0379141 A1* | 12/2014 | Patil | F24F 11/50 |
| | | | 700/277 |
| 2016/0363340 A1* | 12/2016 | Shikii | F24F 11/74 |
| 2019/0041822 A1* | 2/2019 | Burke | G05B 19/0428 |
| 2019/0187634 A1* | 6/2019 | Fan | F24F 11/65 |
| 2020/0234136 A1* | 7/2020 | Kitagawa | G06N 3/082 |
| 2020/0278130 A1* | 9/2020 | Konno | F24F 11/58 |
| 2020/0304575 A1* | 9/2020 | Ito | G06Q 10/10 |
| 2020/0333033 A1* | 10/2020 | Kitagawa | G05B 13/042 |
| 2020/0334574 A1* | 10/2020 | Ishida | G06F 11/3058 |
| 2021/0164677 A1* | 6/2021 | Lee | G05B 19/042 |

FOREIGN PATENT DOCUMENTS

| | | |
|---|---|---|
| JP | 6-347080 A | 12/1994 |
| JP | 11-94327 A | 4/1999 |
| JP | 2001-280663 A | 10/2001 |
| JP | 2009-92252 A | 4/2009 |
| JP | 2010-74591 A | 4/2010 |
| JP | 2011-149615 A | 8/2011 |
| JP | 2011-196666 A | 10/2011 |
| JP | 2011-247514 A | 12/2011 |
| JP | 2012-7805 A | 1/2012 |
| JP | 2012-220036 A | 11/2012 |
| JP | 2012-225550 A | 11/2012 |
| JP | 2013-164187 A | 8/2013 |
| JP | 2016-156511 A | 9/2016 |
| JP | 2018-109494 A | 7/2018 |
| JP | 2019-27603 A | 2/2019 |
| KR | 101908311 B1 | 10/2018 |
| WO | 2018/203368 A1 | 11/2018 |

OTHER PUBLICATIONS

European Search Report of corresponding EP Application No. 20 85 8050.6.dated Aug. 3, 2022.

International Preliminary Report of corresponding PCT Application No. PCT/JP2020/031331 dated Mar. 3, 2022.

* cited by examiner

|  | FIRST USER-SIDE DEVICE | | | | | SECOND USER-SIDE DEVICE | | | | |
|---|---|---|---|---|---|---|---|---|---|---|
|  | ROTATIONAL SPEED OF FAN | FIRST FLAP | SECOND FLAP | THIRD FLAP | FOURTH FLAP | ROTATIONAL SPEED OF FAN | FIRST FLAP | SECOND FLAP | THIRD FLAP | FOURTH FLAP |
| OPERATION POINT 1 | 1 | 1 | 4 | 4 | 2 | 4 | 3 | 3 | 3 | 1 |
| OPERATION POINT 2 | 3 | 4 | 2 | 3 | 4 | 2 | 4 | 2 | 1 | 2 |
| OPERATION POINT 3 | 4 | 2 | 3 | 1 | 1 | 4 | 2 | 3 | 2 | 1 |
| OPERATION POINT 4 | 1 | 4 | 2 | 2 | 2 | 3 | 3 | 3 | 2 | 2 |
| OPERATION POINT 5 | 1 | 3 | 3 | 2 | 3 | 4 | 3 | 3 | 3 | 4 |
| OPERATION POINT 6 | 1 | 4 | 3 | 4 | 3 | 4 | 3 | 4 | 1 | 3 |
| OPERATION POINT 7 | 3 | 4 | 1 | 2 | 1 | 3 | 1 | 1 | 3 | 2 |
| OPERATION POINT 8 | 2 | 1 | 4 | 1 | 4 | 4 | 2 | 2 | 2 | 4 |
| OPERATION POINT 9 | 4 | 4 | 4 | 4 | 1 | 1 | 1 | 1 | 2 | 1 |
| OPERATION POINT 10 | 1 | 2 | 1 | 3 | 4 | 3 | 1 | 4 | 2 | 2 |
| OPERATION POINT 11 | 2 | 1 | 3 | 4 | 1 | 1 | 4 | 4 | 2 | 1 |
| OPERATION POINT 12 | 1 | 2 | 4 | 1 | 1 | 1 | 1 | 2 | 4 | 3 |

FIG. 7

| NO | DATA ITEM (PARAMETER) | DATA TYPE | DATA CLASSIFICATION |
|---|---|---|---|
| 1 | TEMPERATURE MEASURED BY FIRST TEMPERATURE SENSOR | ~°C | AREA |
| 2 | TEMPERATURE MEASURED BY SECOND TEMPERATURE SENSOR | ~°C | AREA |
| 3 | ROTATIONAL SPEED OF FAN OF FIRST INDOOR UNIT | FOUR STEPS 1 TO 4 | FIRST AIR VOLUME |
| 4 | FIRST FLAP OF FIRST INDOOR UNIT | FOUR STEPS 1 TO 4 | FIRST WIND DIRECTION |
| 5 | SECOND FLAP OF FIRST INDOOR UNIT | FOUR STEPS 1 TO 4 | FIRST WIND DIRECTION |
| 6 | THIRD FLAP OF FIRST INDOOR UNIT | FOUR STEPS 1 TO 4 | FIRST WIND DIRECTION |
| 7 | FOURTH FLAP OF FIRST INDOOR UNIT | FOUR STEPS 1 TO 4 | FIRST WIND DIRECTION |
| 8 | HEAT EXCHANGE TEMPERATURE OF FIRST INDOOR UNIT | ~°C | FIRST REFRIGERANT |
| 9 | ROTATIONAL SPEED OF FAN OF SECOND INDOOR UNIT | FOUR STEPS 1 TO 4 | SECOND AIR VOLUME |
| 10 | FIRST FLAP OF SECOND INDOOR UNIT | FOUR STEPS 1 TO 4 | SECOND WIND DIRECTION |
| 11 | SECOND FLAP OF SECOND INDOOR UNIT | FOUR STEPS 1 TO 4 | SECOND WIND DIRECTION |
| 12 | THIRD FLAP OF SECOND INDOOR UNIT | FOUR STEPS 1 TO 4 | SECOND WIND DIRECTION |
| 13 | FOURTH FLAP OF SECOND INDOOR UNIT | FOUR STEPS 1 TO 4 | SECOND WIND DIRECTION |
| 14 | HEAT EXCHANGE TEMPERATURE OF SECOND INDOOR UNIT | ~°C | SECOND REFRIGERANT |

FIG. 9

AIR CONDITIONING CONTROL SYSTEM, AIR CONDITIONER, AND MACHINE LEARNING DEVICE

CROSS-REFERENCE TO RELATED APPLICATIONS

This is a continuation of International Application No. PCT/JP2020/031331 filed on Aug. 19, 2020, which claims priority to Japanese Patent Application No. 2019-153118, filed on Aug. 23, 2019. The entire disclosures of these applications are incorporated by reference herein.

BACKGROUND

Field of Invention

The present invention relates to an air conditioning control system that controls an air temperature for each area by using an air conditioner.

BACKGROUND INFORMATION

It is one of the problems of the air conditioner to uniformly control the temperature of a space to be air-conditioned and suppress generation of a local hot spot where the temperature is high. When air volumes of a plurality of user-side devices are constant, a temperature in a room becomes non-uniform and power is wasted. In this regard, JP 2012-225550 A proposes to control the air volume according to an intake temperature of the user-side device to thereby reduce non-uniformity of the temperature in the room.

SUMMARY

An air conditioning control system includes an air conditioner, a setting unit, a control unit, and a learning unit. The air conditioner performs air conditioning in a room. The setting unit sets a first temperature and a second temperature. The first temperature is a target temperature for a first area in the room. The second temperature is a target temperature for a second area in the room. The control unit controls the air conditioner so that a temperature of the first area approaches the first temperature and a temperature of the second area approaches the second temperature. The learning unit learns the control of the air conditioner so that the temperature of the first area approaches the first temperature and the temperature of the second area approaches the second temperature.

An air conditioner includes a heat source-side device, a user-side device arranged in a room, a setting unit, and a control unit. The setting unit sets a first temperature and a second temperature. The first temperature is a target temperature for a first area in the room. The second temperature is a target temperature for a second area in the room. The control unit controls an air conditioning unit so that a temperature of the first area approaches the first temperature and a temperature of the second area approaches the second temperature.

A learning device performs learning for a control of an air conditioner to adjust a temperature of a first area to a first temperature, which is a target temperature for the first area, and to adjust a temperature of a second area to a second temperature, which is a target temperature for the second area, by receiving a learning data set. The learning data set includes wind direction data, refrigerant data, air volume data, and area data. The wind direction data is data regarding a blowing-out direction of air blown-out from the air conditioner. The refrigerant data is data regarding a temperature of a refrigerant flowing in the air conditioner or a temperature of the air blown-out from the air conditioner. The air volume data is data regarding the air volume of the conditioned air blown-out from the air conditioner. The area data is data regarding the air temperatures of the first area and the second area.

BRIEF DESCRIPTION OF THE DRAWINGS

FIG. 7 is an operation point table used in the data collecting operation of the first embodiment.

FIG. 9 is a list of a learning data set of the first embodiment.

DETAILED DESCRIPTION OF EMBODIMENT(S)

First Embodiment

(1) Overall Configuration of Air Conditioning Control System 1

An air conditioning control system 1 of a first embodiment includes an air conditioner 10, a setting unit 70, and a control unit 40.

Figure 1:
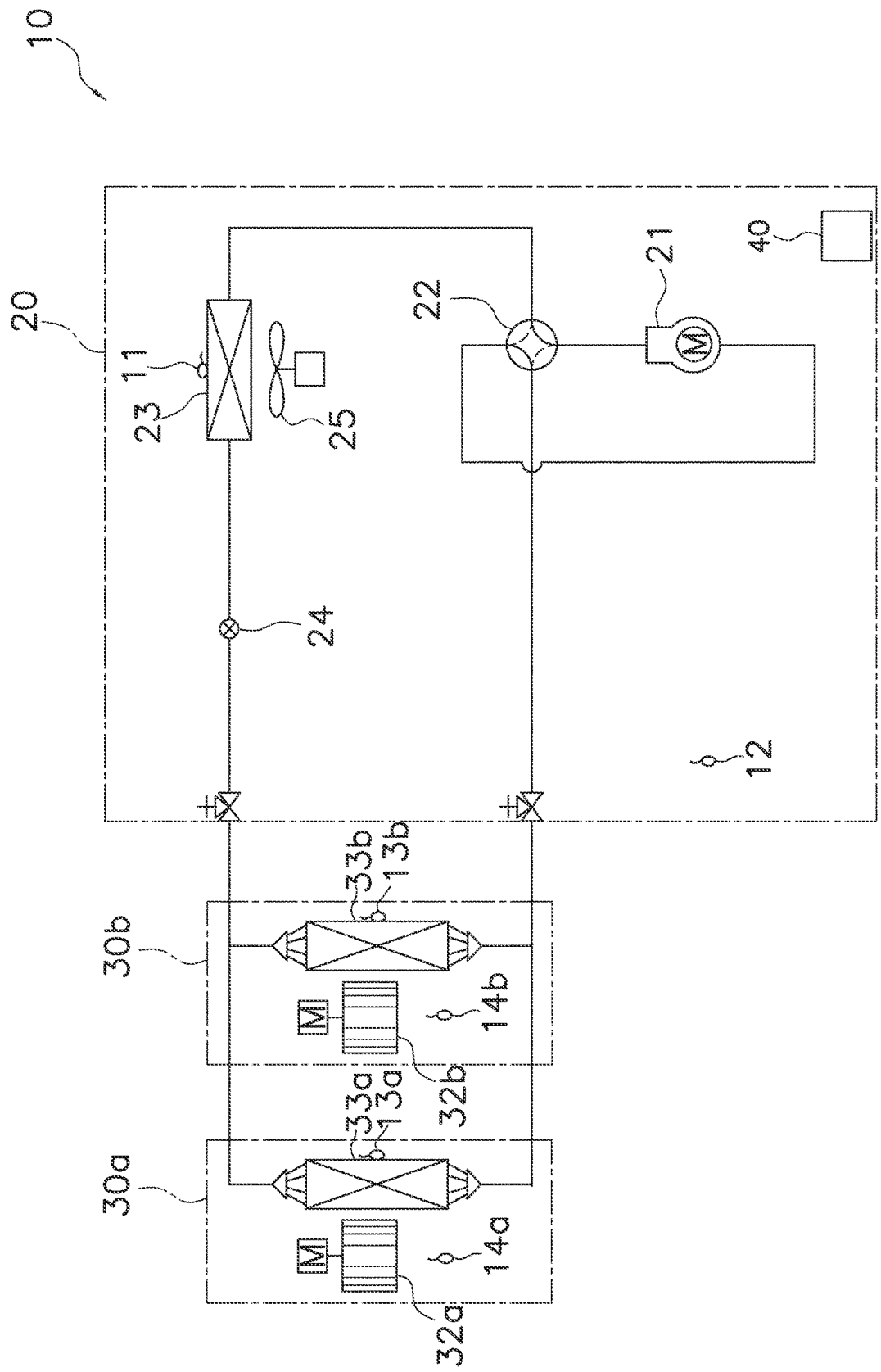
FIG. 1 is a diagram showing a refrigerant circuit of an air conditioner 10.
Figure 2:
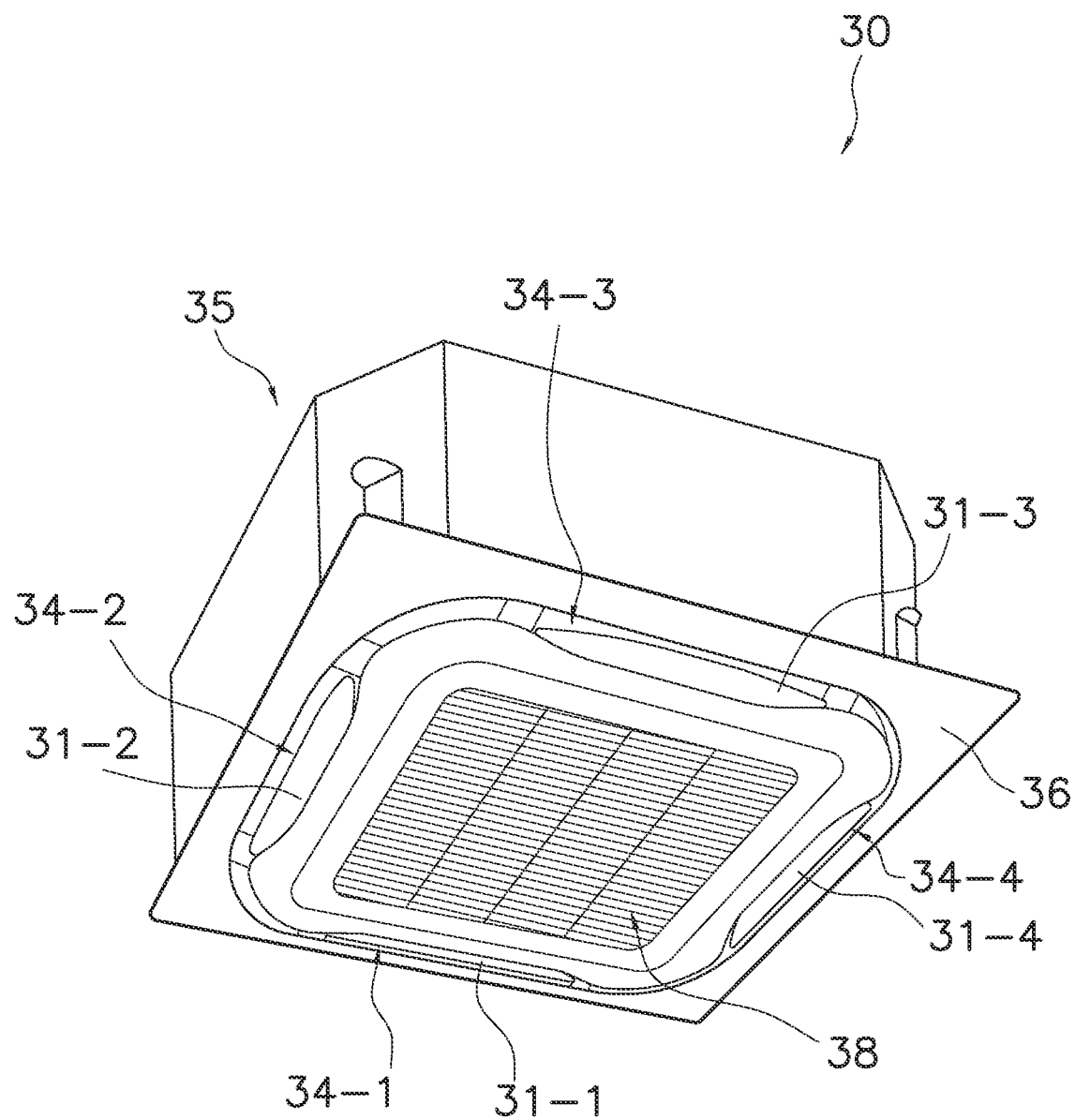
FIG. 2 is a diagram showing an appearance of a user-side device 30 of the air conditioner 10.
Figure 3:
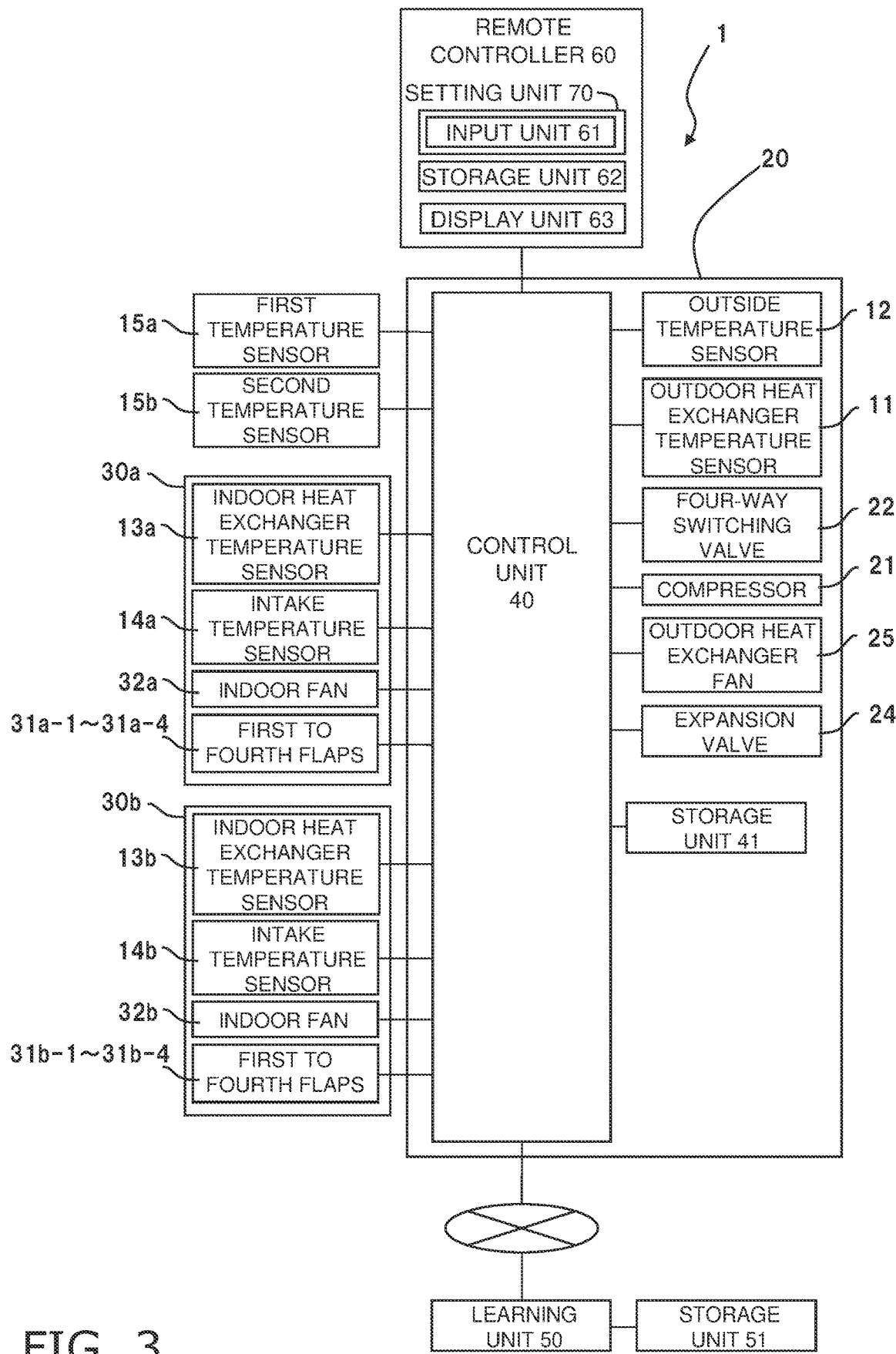
FIG. 3 is a block diagram showing a configuration of an air conditioning control system 1.
Figure 4:
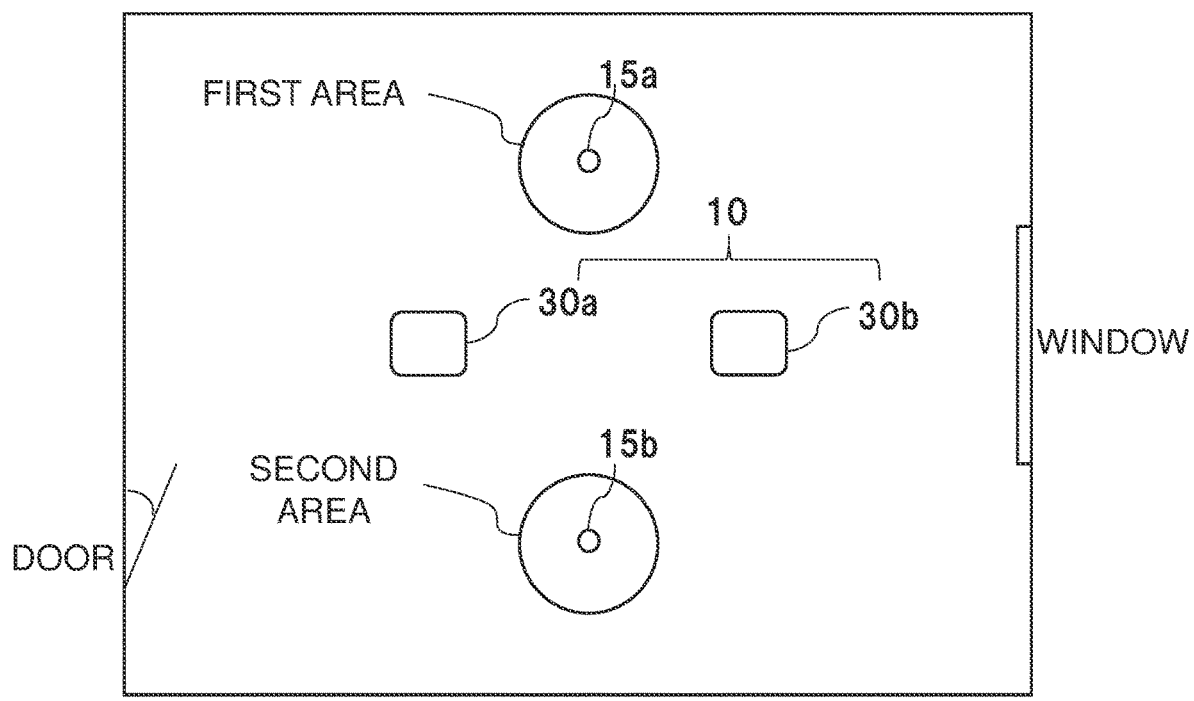
FIG. 4 is a diagram showing arrangement of a first user-side device 30a, a second user-side device 30b, a first temperature sensor 15a, and a second temperature sensor 15b in a room.

FIG. 1 shows a refrigerant circuit of the air conditioner 10 of the first embodiment, FIG. 2 shows an appearance of a user-side device 30 of the air conditioner 10, FIG. 3 is a block diagram showing a configuration of the air conditioning control system 1, and FIG. 4 shows arrangement of a first user-side device 30a, a second user-side device 30b, a first temperature sensor 15a, and a second temperature sensor 15b in a mom.

(1-1) Configuration of Air Conditioner 10

The air conditioner 10 of the present embodiment includes two user-side devices 30a and 30b, a heat source-side device 20, and a refrigerant pipe connecting the user-side devices 30a and 30b and the heat source-side device 20 to each other.

The user-side devices 30a and 30b have the same configuration, and one user-side device 30 will be described with reference to FIGS. 2 and 3. As shown in FIGS. 2 and 3, the user-side device 30 includes a casing 35, an indoor heat exchanger 33, an indoor fan 32, flaps 31-1 to 31-4, an indoor heat exchanger temperature sensor 13, and an intake temperature sensor 14. In the user-side device 30, the indoor heat exchanger 33 and the indoor fan 32 are housed inside the casing 35. The user-side device 30 of the present embodiment is a ceiling-suspended type. The casing 35 is arranged so as to be embedded in a ceiling of the room. A decorative panel 36 arranged at a lower part of the casing is arranged so as to project downward from the ceiling.

In the user-side device 30, air is sucked through an intake port 38 positioned at the center of the decorative panel 36 by rotation of the indoor fan 32, is heated or cooled by exchanging heat with the indoor heat exchanger 33, and is blown-out in all directions through blowing-out ports 34-1 to 34-4. An air volume is controlled by a rotational speed of the indoor fan 32. A wind direction can be changed by controlling orientations of the flaps 31-1 to 31-4 attached to the blowing-out ports 34-1 to 34-4, respectively. Further, the intake temperature sensors 14a and 14b (shown in the block diagram of FIG. 3) are arranged near the intake port 38 inside the casing 35, and measure a temperature of the air near the intake port 38. The temperature of the air near the intake port 38 is one of data regarding the intake air temperature (intake temperature data in a modified example). The data regarding the intake air temperature is not limited to the temperature of the air near the intake port, and may be data regarding a temperature of the air in the intake port or a temperature of the sucked air. The user-side device 30 is also provided with temperature sensors 13a and 13b (shown in the block diagram of FIG. 3) that measure a temperature of a heat transfer tube of the indoor heat exchanger 33.

As shown in FIGS. 2 and 3, the heat source-side device 20 includes a compressor 21, a four-way switching valve 22, an outdoor heat exchanger 23, an outdoor heat exchanger fan 25, an expansion valve 24, an outdoor heat exchanger temperature sensor 11, an outside temperature sensor 12, a control unit 40, and a storage unit 41.

The air conditioner 10 of the present embodiment can perform air conditioning such as cooling, heating, and dehumidification in the room where the user-side device 30 is arranged. The air conditioner 10 switches between a cooling operation and a heating operation by switching the four-way switching valve 22.

During the cooling operation, a refrigerant discharged from the compressor 21 flows in the order of the four-way switching valve 22, the outdoor heat exchanger 23, the outdoor expansion valve 24, the indoor heat exchanger 33, and the four-way switching valve 22, and then is sucked into the compressor 21 again. Here, the outdoor heat exchanger 23 functions as a radiator to heat the outside air, and the indoor heat exchanger 33 functions as an evaporator to cool the indoor air.

During the heating operation, the refrigerant discharged from the compressor 21 flows in the order of the four-way switching valve 22, the indoor heat exchanger 33, the expansion valve 24, the outdoor heat exchanger 23, and the four-way switching valve 22, and then is sucked into the compressor 21 again. Here, the indoor heat exchanger 33 functions as a radiator to heat the indoor air, and the outdoor heat exchanger 23 functions as an evaporator to cool the outside air.

(1-2) Arrangement of User-Side Devices 30a and 30b, First Temperature Sensor 15a, and Second Temperature Sensor 15b in Room.

As shown in FIG. 4, the air conditioning control system 1 of the present embodiment includes the first temperature sensor 15a and the second temperature sensor 15b that are positioned away from the user-side devices 30a and 30b and can measure a temperature of each area in the room. The first temperature sensor 15a and the second temperature sensor 15b are arranged, for example, in furniture such as chairs in a conference room, partitions, and the like. The first temperature sensor 15a measures a temperature of the air in a first area S1, and the second temperature sensor 15b measures a temperature of the air in a second area S2. The first temperature sensor 15a and the second temperature sensor 15b are each connected to the control unit 40 by wireless communication. Temperature data measured by the first temperature sensor 15a and the second temperature sensor 15b are transmitted to the control unit 40. The control unit 40 controls the temperatures of the air in the first area S1 and the air in the second area S2 by using the received temperature data.

(1-3) Control Unit 40

FIG. 3 is a block diagram showing a configuration of the air conditioning control system 1 of the present embodiment.

The control unit 40 of the air conditioning control system 1 is arranged in the heat source-side device 20 together with the storage unit 41 connected to the control unit 40.

The control unit 40 is a computer provided with a central processing unit (CPU) and a memory. The control unit 40 is not limited to one computer. The control unit 40 may be implemented by a plurality of computers. The plurality of computers may be arranged at a plurality of locations. Some of the computers may be arranged on the cloud. In this case as well, the plurality of computers are arranged so as to be able to communicate with each other, and can perform a control in a cooperative manner. The control unit 40 controls operations of various devices included in the user-side device 30 and the heat source-side device 20. Specifically, the control unit 40 controls the compressor 21, the four-way switching valve 22, the expansion valve 24, and the like to control a refrigeration cycle. In addition, the control unit 40 controls the number of rotations of the indoor fan 32 to change the air volume. The control unit 40 controls the orientations of the flaps 31-1 to 31-4 to control the wind direction.

The control unit 40 receives measurement data of various sensors and uses the measurement data for controlling various devices. The various sensors include the first temperature sensor 15a, the second temperature sensor 15b, the intake temperature sensors 14a and 14b, the outside temperature sensor 12, the temperature sensors 13a and 13b of the indoor heat exchanger 33, and the temperature sensor 11 of the outdoor heat exchanger 23.

The storage unit 41 connected to the control unit 40 stores operation data, a learning data set, and an operation point table.

(1-4) Setting Unit 70 (Remote Controller 60)

The setting unit 70 sets a first temperature, which is a target temperature for the first area (S1) in the room, and a second temperature, which is a target temperature for the second area (S2) in the room, the first temperature and the second temperature being input by the user. The setting unit 70 is a part of a remote controller.

A remote controller 60 includes the setting unit 70, a storage unit 62, and a display unit 63. The setting unit 70 includes an input unit 61. The user inputs a set temperature for each area by using the input unit 61. The remote controller 60 is connected to the control unit in a wired or wireless manner. Contents set by the remote controller 60 are transmitted to the control unit 40. The control unit 40 controls various devices of the air conditioner 10 based on the set temperature.

A display example of the display unit 63 of the remote controller 60 will be described with reference to FIGS. 10A and 10B. The display unit 63 is not only a display screen, but also a touch panel. In other words, a portion of the display unit 63 that corresponds the touch panel is the input unit 61.

Figure 10A:
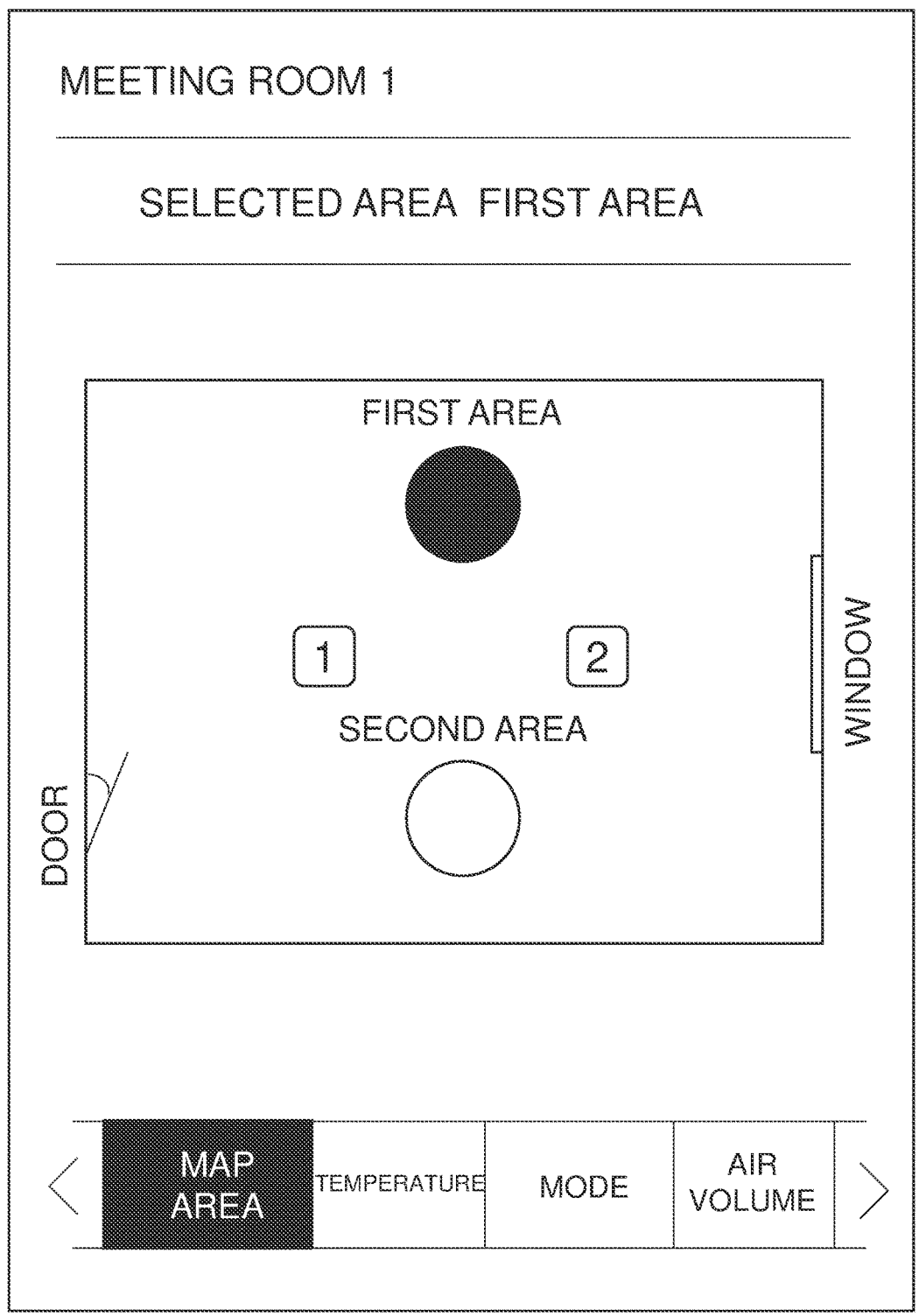
FIG. 10A is a display screen (an input unit 61 and a display unit 63) "area selection screen" of a remote controller 60 of the first embodiment.

When the display unit 63 is activated by the user to operate the remote controller 60, the display unit 63 displays an area selection screen as shown in FIG. 10A. The area selection screen includes a map of a target space. The map is stored in the storage unit 62 of the remote controller 60. The map shows a schematic configuration of the room, for example, positions of a window and a door, arrangement of the first user-side device 30a (indicated by "1" in FIG. 10A), the second user-side device 30b (indicated by "2" in FIG. 10A), the first area S1, and the second area S2, and the like in a space "Meeting Room 1" to be air-conditioned.

When the user touches a circle indicating the first area, the inside of the circle is displayed in black, indicating that the first area is selected. In a case where the user wants to set the second area, similarly, when a circle indicating the second area is touched, the circle indicating the second area is displayed in black, and the first area is displayed in white.

The lowermost section of the display screen of FIG. 10A is a display screen selection section. Specifically, "Map Area", "Temperature", "Mode", "Air Volume", and the like are displayed side by side in a band shape. Furthermore, there is also a selection screen such as "wind direction" in a part that is not displayed. In FIG. 10A, "Map Area" is highlighted, indicating that the area selection screen is selected. The user can scroll the display screen selection section by touching left and right arrows. Then, the user touches a screen that the user wants to display to change the display screen.

Next, in a case where the user inputs the set temperature for the first area, "Temperature" in the display selection section at the lower portion of the screen to select it in a state where the first area is selected in FIG. 10A. Then, a temperature setting screen for the first area S1 of FIG. 10B is displayed.

Figure 10B:
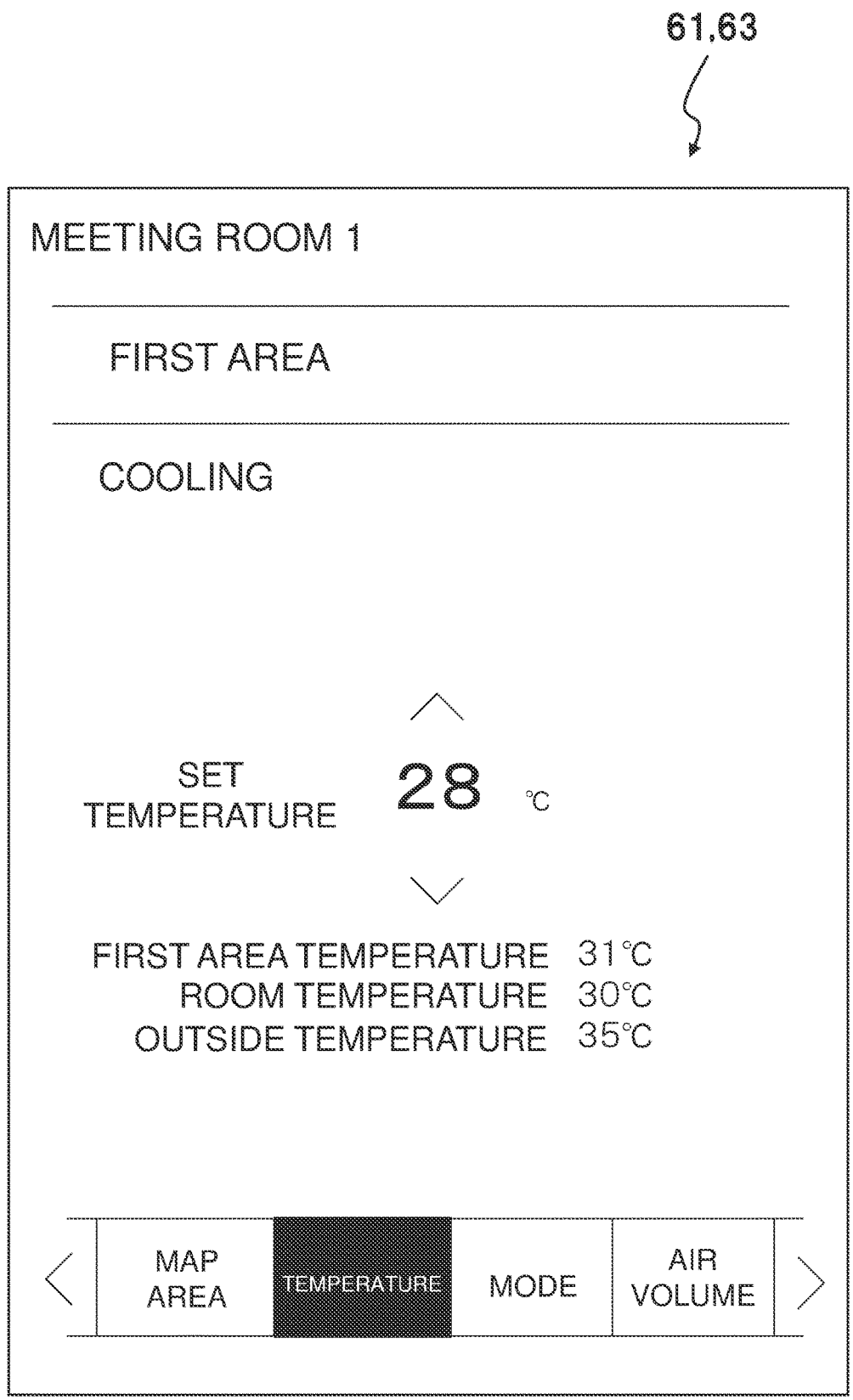
FIG. 10B is a display screen (the input unit 61 and the display unit 63) "temperature setting screen" of the remote controller 60 of the first embodiment.

Similarly to the screen of FIG. 10A, "Meeting Room 1" is displayed at the uppermost section of the screen of FIG. 10B. This indicates a target space or room to be air-conditioned by the air conditioner 10, the target space or room being set by the user.

The second section of the screen of FIG. 10B is indicated as "First Area". This means that the first area S1 is selected.

The third section of the screen of FIG. 10B is indicated as "Cooling". This indicates that an operating mode (mode) is a cooling operation mode.

Next, "Set Temperature 28° C." is displayed at the center of FIG. 10B. This indicates that the current target set temperature for the first area is 28° C. This set temperature can be changed by touching arrows positioned above and below the number "28".

"First Area Temperature 31° C.", "Room Temperature 30° C.", and "Outside Temperature 35° C." are displayed below "Set Temperature 28° C." in FIG. 10B. Those indicate measurement values of the first temperature sensor 15a, a room temperature sensor (intake temperature sensor 14a or 14b), and the outside temperature sensor 12.

The lowermost section of the display screen of FIG. 10B is the display screen selection section as in FIG. 10A.

In a case where the user sets a temperature for the second area next, the user can select "Map Area" in the display screen selection section of FIG. 10B, and select "Second Area" in the area selection screen of FIG. 10A, and then select "Temperature" in the display screen selection section of FIG. 10A to set the temperature for the second area.

(1-5) Learning Unit 50

The learning unit 50 is a computer. The learning unit 50 is further connected to the storage unit 51. As shown in FIG. 3, the learning unit 50 is connected to the control unit via a network. Learning data, which is the operation data of the air conditioner 10, is stored in the storage unit 41. The learning data stored in the storage unit 41 is transmitted to the storage unit 51 connected to the learning unit 50 via the network.

(2) Method of Controlling Indoor Air Temperature by Air Conditioning Control System 1

An indoor air temperature control performed by the air conditioning control system 1 of the present embodiment will be described with reference to the drawings. In the present embodiment, in the room as shown in FIG. 4, air conditioning of the entire room is performed by using two user-side devices 30a and 30b of the air conditioning control system 1. In particular, the air conditioning control system 1 is controlled so that the target temperatures for the first area and the second area are reached.

(2-1) Overall Flow of Control

Figure 5:
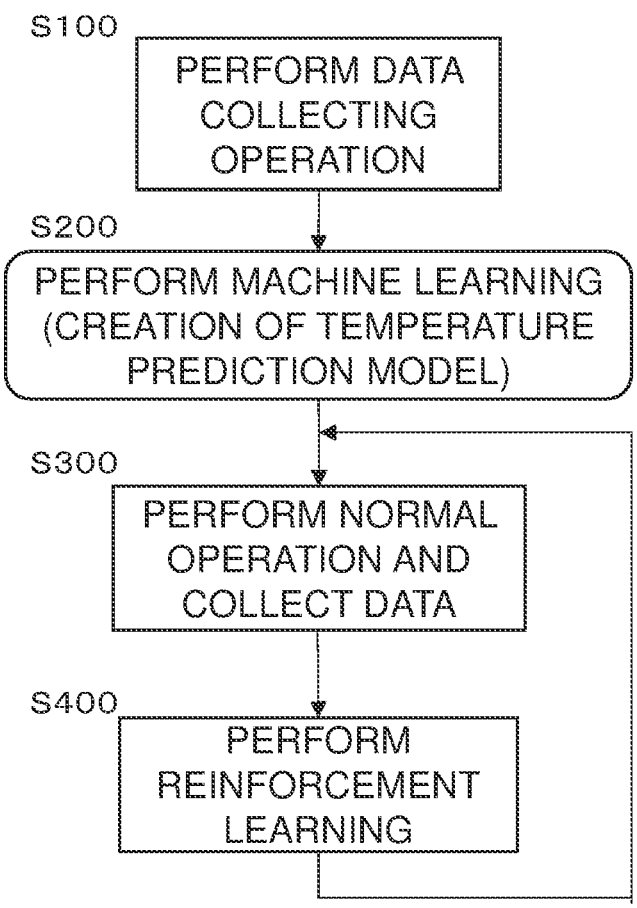
FIG. 5 is a diagram showing an overall flow of an indoor air temperature control performed by the air conditioning control system 1 of a first embodiment.

The overall flow of the control will be described with reference to FIG. 5.

First, in Step S100, a data collecting operation is performed after installing the user-side devices 30a and 30b in the room (target space) or after rearranging the first temperature sensor 15a and the second temperature sensor 15b. The data collecting operation means an operation in which the air conditioning control system 1 is operated with a predetermined setting and the learning data is collected.

Next, in Step S200, machine learning is performed using the learning data collected in the data collecting operation. A learning data set collected by the machine learning is stored in the storage unit 41.

Next, in Step S300, after performing the machine learning, learning data is collected while operating the air conditioner using a trained model.

Finally, in Step S400, reinforcement learning is performed using the learning data collected in Step S300.

(2-2) Data Collecting Operation (S100)

The data collecting operation in Step S100 will be described with reference to a flowchart of FIG. 6A and an operation point table of FIG. 7.

First, an operation point 1 is specified (S101). Operation conditions of each operation point are set in advance for each operation point. An example of the operation conditions for each operation point are shown in the operation point table of FIG. 7. FIG. 7 shows some of the operation conditions for each operation point. In FIG. 7, a rotational speed of the fan and angles of the first to fourth flaps in each of the first user-side device 30a and the second user-side device 30b are shown as the operation conditions. Details thereof will be described in a description of the learning data set.

The control unit 40 reads the operation conditions for the operation point 1 stored in the storage unit 41, and starts the operation of the air conditioner 10 by using the operation conditions (S102).

Next, temperature saturation determination is performed in Step S500. The temperature saturation determination will be described in detail in (2-3) below. Here, the processing proceeds to Step S103 with a result of the temperature saturation determination.

In Step S103, it is determined whether or not the temperatures measured by the first temperature sensor 15a and the second temperature sensor 15b are saturated (S103).

In a case where it is determined in Step S103 that the temperatures measured by the first temperature sensor 15a and the second temperature sensor 15b are saturated, the operation condition is acquired as the learning data (S104).

In a case where it is determined in Step S103 that the temperatures measured by the first temperature sensor 15a and the second temperature sensor 15b are not saturated, the acquisition of the learning data (S104) is skipped and the processing proceeds to Step S105.

Next, in Step S105, the control unit 40 determines whether or not there is a next operation point. In a case where there is a next operation point, the next operation point is specified (S106), the processing returns to S102, and Steps S102, S500, and S103 to S105 are repeated. In this way, in a case of the data shown in FIG. 7, the learning data is acquired or is tried to be acquired from the operation point 1 to the operation point 12 in order, such that the learning data is acquired (or is tried to be acquired) for all the operation points, and the data collecting operation is terminated.

(2-3) Temperature Saturation Determination Flow

The temperature saturation determination flow will be described with reference to the flowchart of FIG. 6B. The temperature saturation determination is used not only in Step S500 of FIG. 6B in the above-described data collecting operation, but also in Step S500 of FIG. 8 in learning data collection in a normal operation. S500 of FIG. 6B or S500 of FIG. 8 corresponds to S501 to S507 of FIG. 6B.

Figure 6A:
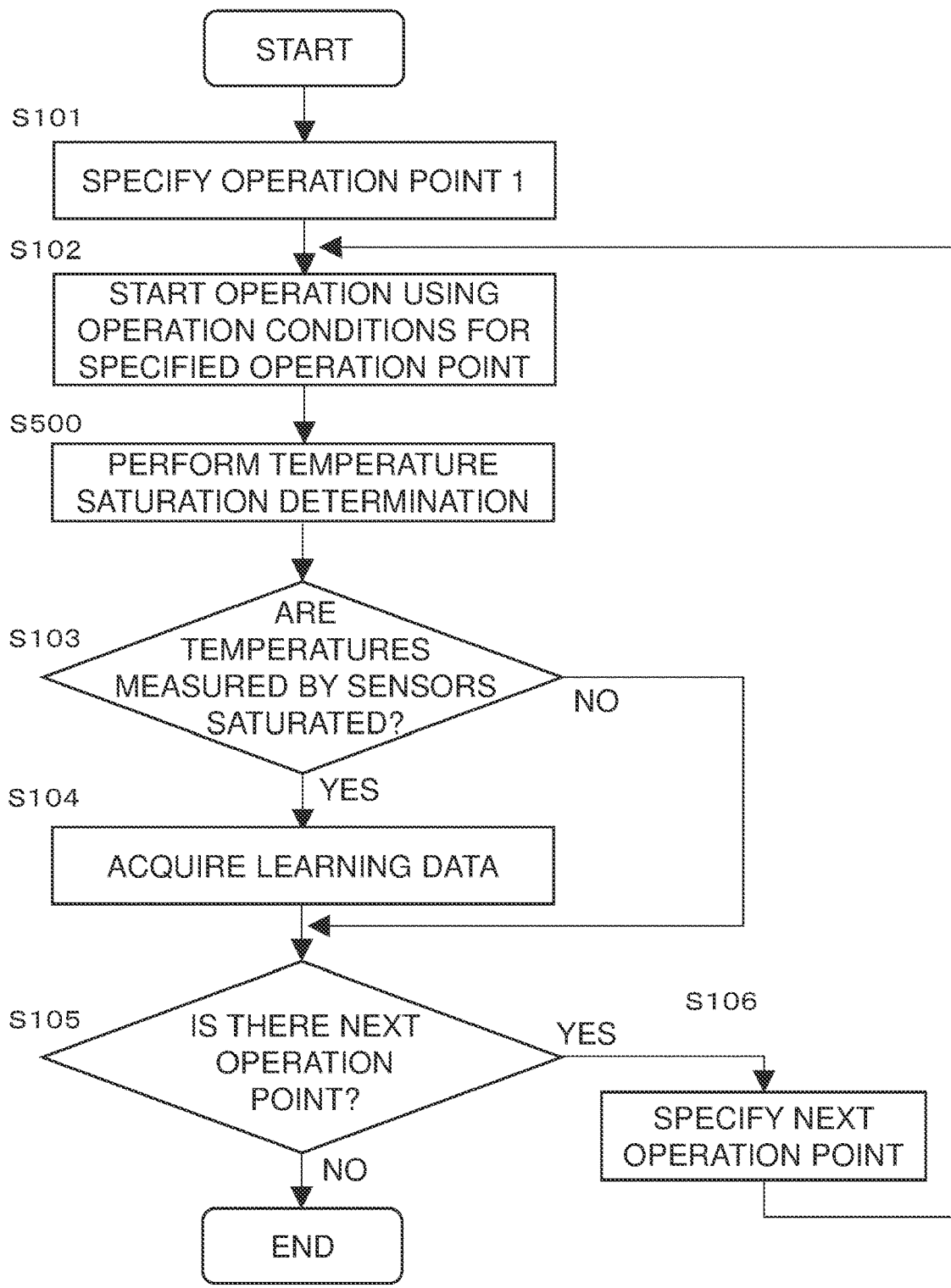
FIG. 6A is a flowchart of a data collecting operation (S100) of the first embodiment.
Figure 8:
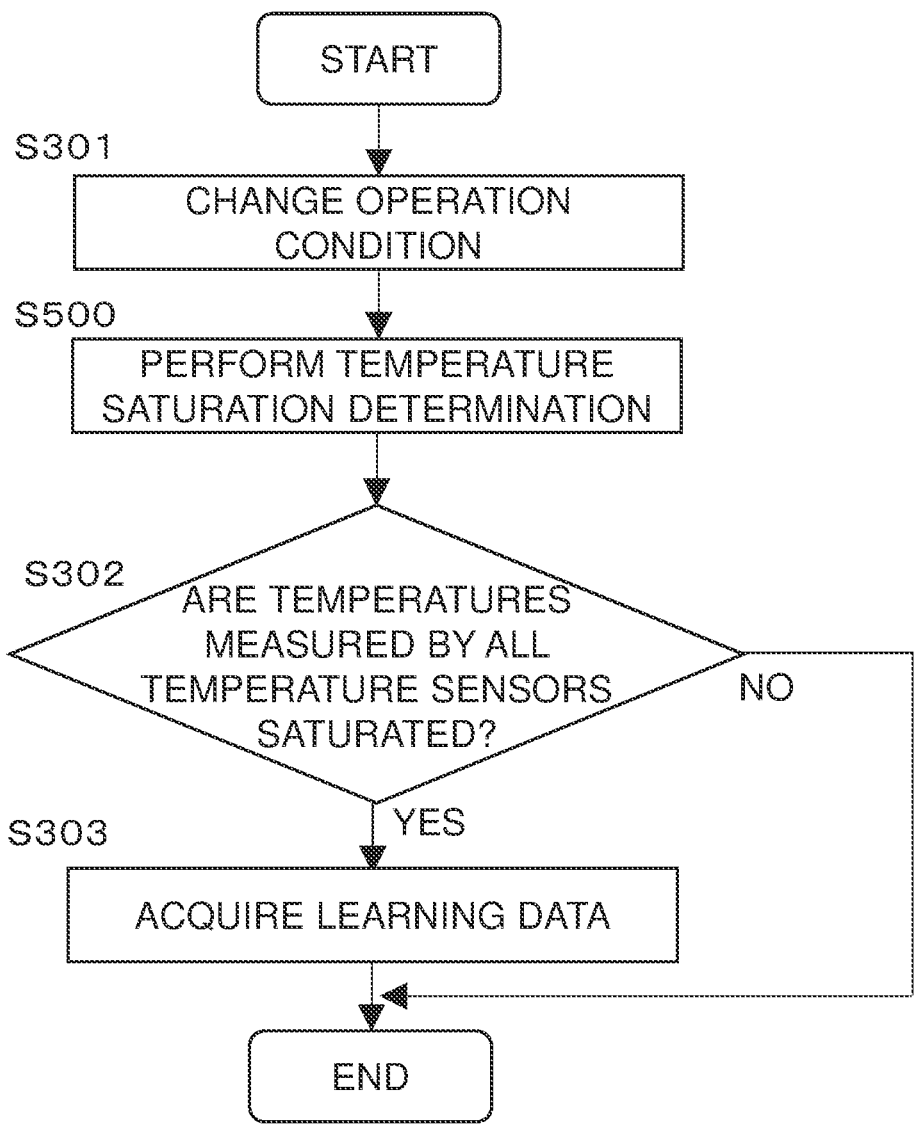
FIG. 8 is a flowchart showing a learning data acquisition flow of the first embodiment.

The temperature saturation determination flow is started when the setting of the operation condition of the air conditioner 10 is switched as in Step S102 of FIG. 6A or Step S301 of FIG. 8. The change of the operation condition not only means that the operation condition is changed by an input from the user, but also means that the operation is started, the operation point is changed in the data collecting operation, and the operation condition is automatically changed, for example, the operation condition is changed by the scheduled operation.

In Step S501, waiting is performed for 10 minutes. Then, in Step S502, it is determined whether or not the operation condition has been changed during the waiting of 10 minutes (S501). In a case where the operation condition has been changed, the processing returns to Step S501 and waiting is performed for another 10 minutes. In a case where the operation condition has not been changed during the waiting, the processing proceeds to Step S503.

In Step S503, it is determined whether or not the temperatures measured by the first temperature sensor 15a and the second temperature sensor 15b are stable.

The control unit 40 acquires data regarding the temperatures measured by the first temperature sensor 15a and the second temperature sensor 15b every minute. A state in which the temperatures measured by the temperature sensors are stable means that the change of the temperatures measured by all the temperature sensors is less than 1° C. for five minutes.

In Step S503, the control unit 40 determines whether or not the temperatures measured by all the temperature sensors are stable. When the temperatures measured by all the temperature sensors are stable, it is determined that the temperatures are saturated (S504).

In a case where the temperatures measured by all the temperature sensors are not stable in Step S503, the processing proceeds to Step S505. In Step S505, it is determined whether or not 30 minutes have elapsed from the change of the operation condition.

In a case where it is determined in Step S505 that 30 minutes have not elapsed from the change of the operation condition, the processing proceeds to Step S507, waiting is performed for one minute, and then the processing returns to Step S502.

In a case where it is determined in Step S505 that 30 minutes have elapsed from the change of the operation condition, the processing proceeds to Step S506, and it is determined that the temperatures are not saturated.

Figure 6B:
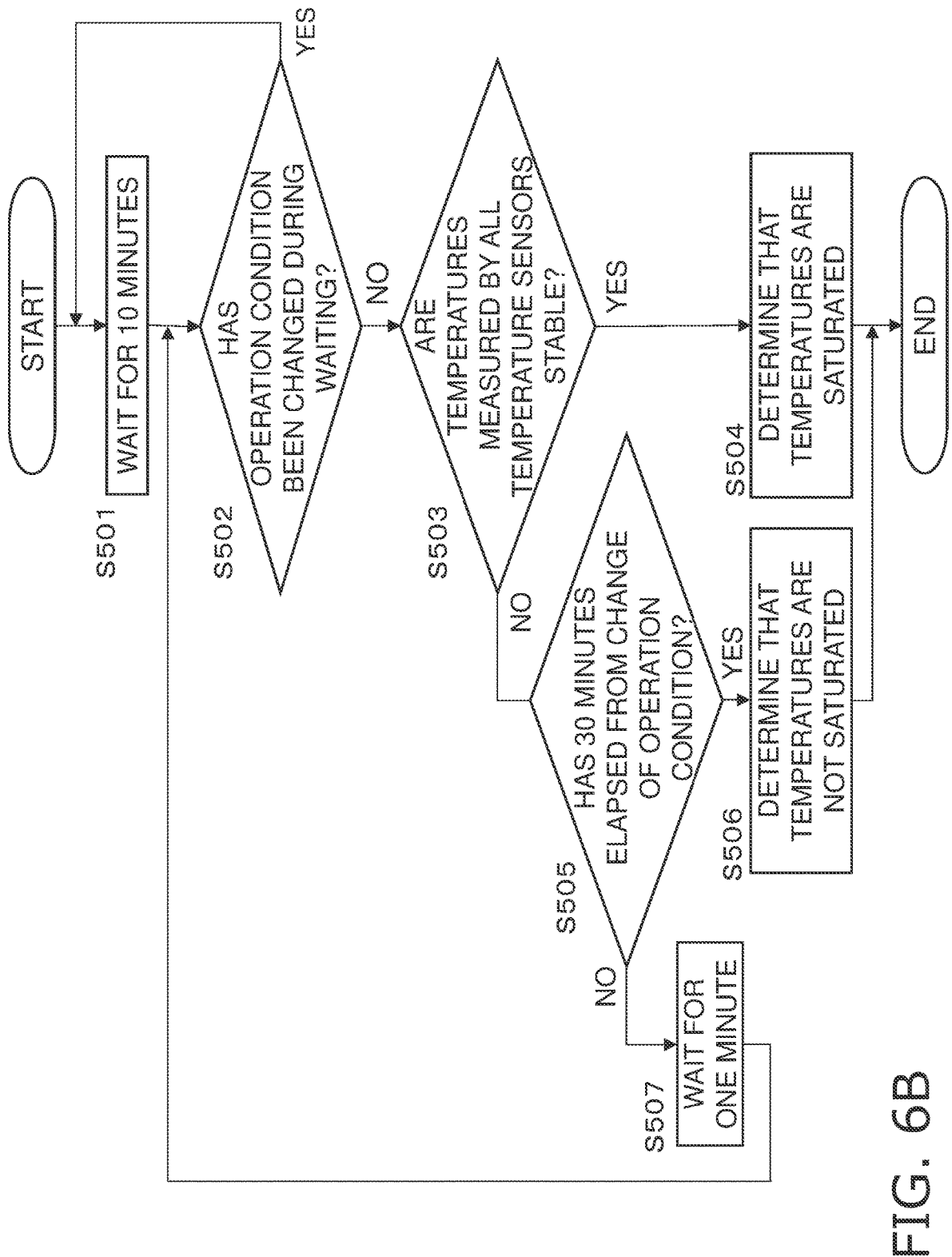
FIG. 6B is a flowchart of temperature saturation determination of the first embodiment.

As described above, it is determined whether or not the temperatures are saturated by performing Steps S501 to S507 of FIG. 6B and reaching Step S504 or S506.

In the saturation determination, for example, a method in which it is determined that the temperatures are saturated when a temperature change rate becomes less than a certain value may be used in addition to the above-described method.

(2-4) Learning Data Set

FIG. 9 is a list of the learning data set created by the machine learning (S200) of the present embodiment. As described above, data of the learning data set of the present embodiment is data acquired when it is determined that the values of the temperature sensors are saturated.

The learning data set of the present embodiment includes wind direction data, refrigerant data, air volume data, and area data. Note that, in the list of FIG. 9, each data item (parameter) is shown in a data classification column at the right end and indicates which of the wind direction data, the refrigerant data, the air volume data, and the area data is related.

The wind direction data is data regarding a blowing-out direction of the air blown-out from the air conditioner 10. In the list of FIG. 9, the wind direction data corresponds to No. 4 to No. 7, and No. 10 to No. 13. Specifically, the wind direction data corresponds to an inclination angle of the flap. There are four inclination angles of the flaps: 1, 2, 3, and 4. At the inclination angle of 1, an air blowing-out angle is almost horizontal, and at the inclination angle of 4, the inclination angle of the flap is set so that the air is blown-out almost directly downward. The inclination angles of 2 and 3 are between the inclination angles of 1 and 4.

The refrigerant data is data regarding the temperature of the refrigerant flowing in the air conditioner or the temperature of the air blown-out from the air conditioner 10. The data regarding the temperature of the refrigerant flowing in the air conditioner is data regarding the temperature of the heat transfer tube of the indoor heat exchanger, the temperature of the refrigerant pipe connected to the indoor heat exchanger, and the pressure of the refrigerant flowing in the refrigerant pipe. The data regarding the temperature of the air blown-out from the air conditioner 10 may be a blowing-out temperature measured by arranging blowing-out temperature sensors at the blowing-out ports 34-1 to 34-4 of the air conditioner 10.

In the present embodiment, the refrigerant data is an evaporation temperature during the cooling operation as the data regarding the temperature of the refrigerant flowing in the air conditioner. Specifically, the refrigerant data is a temperature of the indoor heat exchanger (evaporator) measured by the indoor heat exchanger temperature sensor 13. In the list of FIG. 9, No. 8 and No. 14 correspond to the refrigerant data.

The air volume data is data regarding an air volume of the conditioned air blown-out from the air conditioner 10. In the list of FIG. 9, No. 3 and No. 9 correspond to the air volume data. Specifically, the air volume data is the rotational speed of the indoor fan 32. Here, the rotational speed is changed in four steps, and the rotational speed is gradually increased from 1 to 4.

The area data is data regarding air temperatures of the first area S1 and the second area S2. In the present embodiment, the area data is the measurement data of the first temperature sensor 15*a* and the second temperature sensor 15*b*.

(2-5) Machine Learning (Creation of Temperature Prediction Model) (S200)

The machine learning (creation of a temperature prediction model) in Step S200 will be described.

When the data collecting operation in Step S100 is completed, an operation point table X and acquired temperature data Y are created.

$$X = \begin{pmatrix} c1 & d1 & e1 & f1 & g1 & \dots \\ c2 & d2 & e2 & f2 & g2 & \dots \\ c3 & d3 & e3 & f3 & g3 & \dots \\ c4 & d4 & e4 & f4 & g4 & \dots \\ c5 & d5 & e5 & f5 & g5 & \dots \end{pmatrix} \quad \text{Formula 1}$$

$$Y = \begin{pmatrix} a1 & b1 \\ a2 & b2 \\ a3 & b3 \\ a4 & b4 \\ a5 & b5 \end{pmatrix} \quad \text{Formula 2}$$

In the operation point table X and the acquired temperature data Y, each row corresponds to the same operation point. For example, a2, b2, c2, d2, and the like correspond to the operation point 2. Further, in the acquired temperature data Y, Column a (a1, a2, a3, and the like) is the temperature measured by the first temperature sensor, and Column b (b1, b2, b3, and the like) is the temperature measured by the second temperature sensor. In the operation point table X, Column c (c1, c2, c3, and the like) corresponds to the rotational speed of the indoor fan of the first user-side device 30*a*, and Column d (d1, d2, d3, and the like) corresponds to the angle of the first flap of the first user-side device 30*a*.

In the temperature prediction model creation step (S200), a coefficient A is calculated by the following formula using an objective variable Y and an explanatory variable X.

$$A = (X^T \dots X)^{-1} \dots X^T \dots Y \quad (1)$$

Note that, in Formula (1), $^T$ represents a transposed matrix and $^{-1}$ represents an inverse matrix.

Next, the following model formula is created using the coefficient A.

$$Y' = AX \quad (2)$$

When the user inputs a target temperature Y', a value of X is calculated from Formula (2) above, and a control corresponding to each value of X is performed (X is a matrix of the angle of each flap, the evaporation temperature, the rotational speed of the fan, and the like).

(2-6) Data Collection in Normal Operation (S300) and Additional Learning (S400)

In Step S300, the control unit 40 further collects operation data while performing the normal operation. A learning data collection flow in the normal operation will be described with reference to the flowchart of FIG. 8.

A trigger in the normal operation is, for example, input of the first temperature, which is the target temperature for the first area (S1) in the room, and the second temperature, which is the target temperature for the second area (S2) in the room, to the input unit 61 of the remote controller 60 by the user (S301). As a result, the setting unit 70 sets the first temperature and the second temperature.

Next, the control unit 40 performs the temperature saturation determination in Step S500. The details of the temperature saturation determination are as described in Steps S501 to S507 of FIG. 6B.

After the temperature saturation determination, the processing proceeds to Step S302 to determine whether or not the temperatures measured by all the temperature sensors are saturated.

In a case where it is determined in Step S302 that the temperatures measured by all the temperature sensors are saturated, the learning data is acquired in Step S303, and the data collection in the normal operation is terminated.

In a case where it is determined in Step S302 that the temperatures measured by all the temperature sensors are not saturated, the learning data is not acquired, and the data collection in the normal operation is terminated.

As described above, the air conditioning control system 1 further collects data while controlling the air conditioner 10 according to the user's setting by using the created learning data set (S300). The learning data is collected by additionally performing learning (S400) using the data set.

(3) Characteristics (3-1)

In the air conditioning control system 1 of the present embodiment, the user separately sets, in the setting unit 70, the first temperature, which is the target temperature for the first area S1 in the room, and the second temperature, which is the target temperature for the second area S2 in the room. Then, the control unit 40 controls the air conditioner 10 so that the temperature of the first area S1 approaches the first temperature and the temperature of the second area S2 approaches the second temperature.

In this way, by enabling the temperature setting for each area and controlling the air conditioner 10 based on the temperature setting, the convenience of the user can be further enhanced. In addition, it is possible to improve energy conservation while ensuring comfort of the user.

In particular, in a case where temperature unevenness is severe between a perimeter zone such as an area near a window and an area where a person is present in the room, and the air conditioner 10 is operated based on the target temperature for the entire room set in the setting unit 70, the temperature of the area where the person is present may differ from the target temperature for the room due to the temperature unevenness in the room. In such a case, the user cannot spend time comfortably in the room. However, in the present disclosure, since the target temperature can be set for each area, even when temperature unevenness occurs across the respective areas of the room, the temperature of the area where the person is present can be an optimum temperature.

Therefore, the user can spend time comfortably in the room. Furthermore, the air conditioner can be operated for a required location with a required capacity, which saves energy.

(3-2)

In the present embodiment, the first user-side device 30a and the second user-side device 30b control the air temperatures of the first area S1 and the second area S2 in a cooperative manner.

As such two user-side devices perform the control in a cooperative manner, the comfort is enhanced, power consumption is suppressed, and the control can be quickly performed.

(3-3)

In the air conditioning control system of the present embodiment, the first temperature sensor 15a is arranged in the first area S1 and the second temperature sensor 15b is arranged in the second area S2.

By arranging the temperature sensor in each area in this way, accurate temperature measurement for each area can be performed, and a temperature control for each area can be performed appropriately.

(3-4)

In the present embodiment, each area is registered in the storage unit 62 of the remote controller 60. A registration location may be another location.

Further, each temperature sensor is arranged in each area and fixed in each area.

Since each area is registered in the air conditioning control system, the user can confirm a position of each area by using the map of the storage unit 62, and the temperature can be easily set.

(3-5)

A control method of the air conditioner 10 of the present embodiment uses the learning data set including the wind direction data, the refrigerant data, the air volume data, and the area data. The wind direction data is data regarding a blowing-out direction of air blown-out from the air conditioner. The refrigerant data is data regarding a temperature of a refrigerant flowing in the air conditioner or a temperature of the air blown-out from the air conditioner. The air volume data is data regarding the air volume of the conditioned air blown-out from the air conditioner. The area data is data regarding the temperature of the air in the first area S1.

By controlling the air conditioner 10 using such a learning (learned) data set, the temperature of the air in each area can be controlled quickly and efficiently.

It is difficult to perform the control by considering many factors such as a layout of the room, arrangement of things, and an environment inside and outside the room. However, by performing learning using actual operation data in the room, it is possible to implement optimum air conditioning for each area without performing complicated calculations considering many factors.

(4) Modification Examples (4-1) Modification Example 1A

Modified Example 1A is the same as that of the first embodiment except that a learning data set is different from that of the first embodiment. The learning data set of Modified Example 1A includes, in addition to the learning data set of the first embodiment, intake temperature data of the first user-side device of the air conditioner 10, intake temperature data of the second user-side device, outside air temperature data, thermal load data regarding a thermal load in the room, and power consumption data.

The learning data set of Modified Example 1A includes the intake temperature data regarding the intake air temperature of the user-side device. The intake air temperature of the user-side device is measured by the intake temperature sensors 14a and 14b arranged near the intake port 38 of the user-side device 30. Since the learning data set of Modified Example 1A includes the intake temperature data in addition to the wind direction data, the refrigerant data, the air volume data, and the area data, the temperature of the air in the first area S1 can be controlled more accurately.

Further, the learning data set of Modified Example 1A includes the outside air temperature data regarding the temperature of the outside air. The temperature of the outside air is measured by the outside temperature sensor 12 arranged in the heat source-side device 20. Since the learning data set of Modified Example 1A includes the outside air temperature data in addition to the wind direction data, the refrigerant data, the air volume data, and the area data, the temperature of the air in the first area can be controlled more accurately.

Further, the learning data set of Modified Example 1A includes the thermal load data. The thermal load data is data regarding, for example, heat generated by a device such as a server arranged indoor in a data center. Since the learning data set of Modified Example 1A includes the thermal load data in addition to the wind direction data, the refrigerant data, the air volume data, and the area data, the air temperatures of the first area and the second area can be controlled more accurately.

Further, the learning data set of Modified Example 1A includes the power consumption data regarding power consumption of the air conditioner 10. Since the learning data set of Modified Example 1A includes the power consumption data in addition to the wind direction data, the refrigerant data, the air volume data, and the area data, the air temperatures of the first area and the second area can be controlled more accurately while suppressing the power consumption.

In addition to the wind direction data, the refrigerant data, the air volume data, and the area data, for example, any one or all of the intake temperature data, the outside air temperature data, the thermal load data, and the power consumption data may be included. Further, in addition to the wind direction data, the refrigerant data, the air volume data, and the area data, for example, any two or any three of the intake temperature data, the outside air temperature data, the thermal load data, and the power consumption data may be included.

(4-2) Modification Example 1B

The learning data set used in the first embodiment is acquired in a state where the temperature measured by the sensor is saturated. Data before saturation may be included as a learning data set.

(4-3) Modification Example 1C

In the first embodiment, the first temperature sensor 15a and the second temperature sensor 15b are used. The air conditioner 10 of Modified Example 1C includes an infrared temperature sensor (infrared camera) mounted on the user-side device 30a. The other configurations are similar to those in the first embodiment. The infrared temperature sensor can measure a temperature of a person, a wall, a floor, an obstacle, or the like in a room where the sensor can directly detect infrared rays.

(4-4) Modification Example 1D

In the first embodiment, the first user-side device 30a and the second user-side device 30b form a common refrigerant circuit. The first user-side device 30a and the second user-side device 30b of Modified Example 1D belong to independent refrigerant circuits, respectively. In other words, the first user-side device 30a and the second user-side device 30b of Modified Example 1D are connected to different heat source-side devices 20, respectively. The other configurations are similar to those in the first embodiment.

(4-5) Modification Example 1E

In the first embodiment, the learning unit 50 is arranged on the control unit 40 and the server arranged via the network. A place where the learning unit 50 is arranged is not limited thereto. The learning unit of Modified Example 1E is arranged in the same computer as the control unit 40. The control unit 40 is arranged together with the heat source-side device 20 of the air conditioner 10 or adjacent to the heat source-side device.

(4-6) Modified Example 1F

In the first embodiment, the operation data, the learning data set, and the operation point table are stored in the storage unit 41 in the heat source-side device 20. The location where the driving data, the learning data set, and the operation point table are stored may be another location. In Modified Example 1F, the operation data, the learning data set, and the operation point table are stored in the storage unit 51 directly connected to the learning unit 50.

(4-7) Modification Example 1G

In the first embodiment, the number of user-side devices 30 of the air conditioner is two. The number of user-side devices is not limited to two, and may be one or three or more. In Modified Example 1G, the number of user-side devices is one. The other configurations of the air conditioner 10 are similar to those in the first embodiment.

A learning data set of Modified Example 1G only includes No. 1 to No. 8, and does not include No. 9 to No. 14 in FIG. 9. Since the number of data is small, a learning time is shortened.

(4-8) Modified Example 1H

A configuration of an air conditioning control system of Modified Example 1H is the same as the configuration of the air conditioning control system of the first embodiment. Further, a control method of an air conditioner of Modified Example 1H is the same as the control method of the air conditioner of the first embodiment shown in FIG. 5. Further, a learning data set of Modified Example 1H is also the same as that described in the first embodiment. In the first embodiment, machine learning using multiple regression using the models of Formulas (1) and (2) is performed. A machine learning method is not limited thereto.

For example, the machine learning may be various types of machine learning such as supervised learning, unsupervised learning, semi-supervised learning, reinforcement learning, transduction, and multi-task learning. For example, there are logistic regression, autoregressive integrated moving average (ARIMA), vector autoregression (VAR), support vector machine, decision tree, random forest, boosting, neural network, deep learning, K-means method, ward method, principal component analysis, and the like.

(4-9) Modified Example 1I

In the first embodiment, the air conditioning control system 1 controls the temperatures of the first area S1 and the second area S2 in the room. There may be three or more areas. In Modified Example 1I, there are six areas. The first to sixth temperature sensors are arranged in the first to sixth areas, respectively. The other configurations of the air conditioning control system 1 are the same as those of the first embodiment.

(4-10) Modified Example 1J

In the first embodiment, after the data collecting operation is performed to acquire the learning data, data collection is performed while performing the normal operation. In Modified Example 1J, the normal operation may be performed without performing the data collecting operation to collect the learning data, and the machine learning may be performed after the learning data is accumulated.

Second Embodiment (5) Control Method of Air Conditioner 10 of Air Conditioning Control System 1

Figure 11:
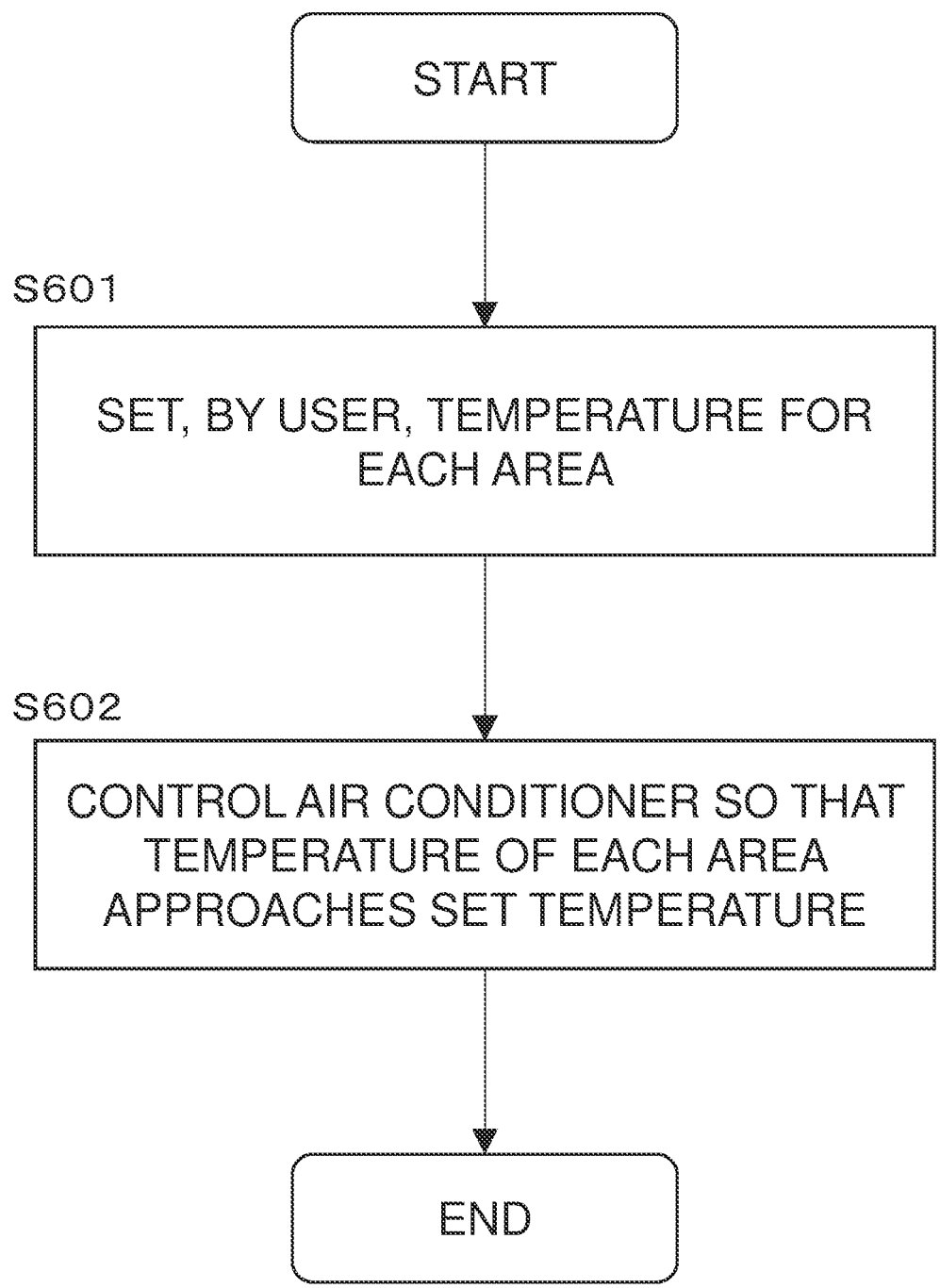
FIG. 11 is a flowchart showing a control method of an air conditioner 10 of a second embodiment.

A configuration of an air conditioning control system 1 of a second embodiment is the same as that of the air conditioning control system 1 of the first embodiment. A control method of an air conditioner 10 of the second embodiment is different from that of the first embodiment. In the first embodiment, the air conditioner 10 is controlled by performing machine learning. In the second embodiment, machine learning is not performed unlike the first embodiment. FIG. 11 is a flowchart showing of a control of the air conditioner 10 of the second embodiment.

In the present embodiment, first, in Step S601, the user sets a temperature for each area in a setting unit 70. A specific temperature setting method is the same as that of the first embodiment.

Next, in Step S602, a control unit 40 controls a user-side device 30a and a user-side device 30b so that a temperature of air in each area approaches the set temperature based on the set temperature of the user.

Third Embodiment (6) Air Conditioning Control System 1 of Third Embodiment

In a third embodiment, the user is allowed to move a first temperature sensor 15a and a second temperature sensor 15b in a room. In this case, it is necessary for a control unit to recognize positions of the first temperature sensor 15a and the second temperature sensor 15b moved by the user. This work may be done manually by the user or may be controlled automatically by a system 1. The other configurations of the air conditioning control system 1 of the present embodiment are the same as those of the first embodiment.

In the present embodiment, it is preferable to recreate the learning data set of the first embodiment every time the positions of the first temperature sensor 15a and the second temperature sensor 15b are changed. In other words, the control shown in the flowchart of FIG. 5 is performed every time the positions of the first temperature sensor 15a and the second temperature sensor 15b are changed. However, regardless of the change of the position of the temperature sensor, in a case where a learning data set corresponding to the first area S1 and the second area S2 is created, it is not necessary to perform the machine learning again every time the position of the temperature sensor is changed. However, in this case, it is necessary to specify each area according to a position where the temperature sensor may be arranged.

The third embodiment does not have the above-described problem in a case where machine learning is not particularly performed as in the second embodiment. However, even in this case, it is necessary for the control unit 40 and a setting unit 70 to recognize the positions of the first temperature sensor 15a and the second temperature sensor 15b moved by the user.

The embodiment of the present disclosure has been described above. Various modifications to modes and details should be available without departing from the object and the scope of the present disclosure recited in the claims.

The invention claimed is:

1. An air conditioning control system comprising:
an air conditioner configured to perform air conditioning in a room, the air conditioner including a plurality of user-side devices in the room, each of the user-side devices including a heat exchanger;
a setting unit configured to set a first temperature and a second temperature, the setting unit including an input configured to set the first and second temperatures, the first temperature being a target temperature for a first area in the room, and the second temperature being a target temperature for a second area in the room;
an electronic controller configured to control the air conditioner so that
a temperature of the first area approaches the first temperature and
a temperature of the second area approaches the second temperature;
a learning unit including a computer, the learning unit being configured to learn control of the air conditioner so that
the temperature of the first area approaches the first temperature and
the temperature of the second area approaches the second temperature,
the learning unit being configured to learn the control of the air conditioner by using a learning data set, the learning data set including data regarding operation of the plurality of user-side devices in the room, the data including
wind direction data regarding a blowing-out direction of air blown-out from the air conditioner,
refrigerant data regarding a temperature of a refrigerant flowing in the air conditioner or a temperature of the air blown-out from the air conditioner,
air volume data regarding an air volume of the air blown-out from the air conditioner, and
area data regarding air temperatures of the first area and the second area.

2. The air conditioning control system according to claim 1, wherein
the electronic controller is configured to control the plurality of user-side devices in a cooperative manner to
control the temperature of the first area to approach the first temperature and
control the temperature of the second area to approach the second temperature.

3. The air conditioning control system according to claim 2, wherein
the electronic controller is configured to control the air conditioner in a state in which
a position where a first temperature sensor in the room is arranged is set as the first area, and
a position where a second temperature sensor in the room is arranged is set as the second area.

4. The air conditioning control system according to claim 2, further comprising:
a remote controller arranged so as to be communicable with the air conditioner, the remote controller including the setting unit,
the setting unit being configured to set values input by a user as the first temperature and the second temperature.

5. The air conditioning control system according to claim 1, wherein
the electronic controller is configured to control the air conditioner in a state in which a position where a first temperature sensor in the room is arranged is set as the first area, and
a position where a second temperature sensor in the room is arranged is set as the second area.

6. The air conditioning control system according to claim 1, further comprising:
a remote controller arranged so as to be communicable with the air conditioner, the remote controller including the setting unit,
the setting unit being configured to set values input by a user as the first temperature and the second temperature.

7. An air conditioner comprising:
a heat source-side device;
a plurality of user-side devices arranged in a room, each of the user-side devices including a heat exchanger and a first sensor disposed therein;
a setting unit configured to set a first temperature and a second temperature, the setting unit including an input configured to set the first and second temperatures, the first temperature being a target temperature for a first area in the room, and the second temperature being a target temperature for a second area in the room, a second sensor being disposed in each of the first area and the second area;
an electronic controller configured to control the heat source-side device and the plurality of user-side devices so that
a temperature of the first area approaches the first temperature and
a temperature of the second area approaches the second temperature,
the electronic controller using operation data transmitted by each of the first and second sensors to facilitate controlling each of the plurality of user-side devices in the room,
the operation data including
wind direction data regarding a blowing-out direction of air blown-out from the air conditioner, refrigerant data regarding a temperature of a refrigerant flowing in the air conditioner or a temperature of the air blown-out from the air conditioner, air volume data regarding an air volume of the air blown-out from the air conditioner, and area data regarding air temperatures of the first area and the second area.

8. The air conditioner according to claim 7, wherein the electronic controller is configured to control the plurality of user-side devices in a cooperative manner to control the temperature of the first area to approach the first temperature and control the temperature of the second area to approach the second temperature.

9. The air conditioner according to claim 8, wherein the electronic controller is configured to control the heat source-side device and the plurality of user-side devices in a state in which a position where a first temperature sensor in the room is arranged is set as the first area, and a position where a second temperature sensor in the room is arranged is set as the second area.

10. The air conditioner according to claim 8, further comprising:

a learning unit including a computer, the learning unit being configured to learn the control of the heat source-side device and the plurality of user-side devices so that the temperature of the first area approaches the first temperature and the temperature of the second area approaches the second temperature.

11. The air conditioner according to claim 8, further comprising:

a remote controller arranged so as to be communicable with the electronic controller, the remote controller including the setting unit, the setting unit being configured to set values input by a user as the first temperature and the second temperature.

12. The air conditioner according to claim 7, wherein the electronic controller is configured to control the heat source-side device and the plurality of user-side devices in a state in which a position where a first temperature sensor in the room is arranged is set as the first area, and a position where a second temperature sensor in the room is arranged is set as the second area.

13. The air conditioner according to any one of claim 7, further comprising:

a learning unit including a computer, the learning unit being configured to learn the control of the heat source-side device and the plurality of user-side devices so that the temperature of the first area approaches the first temperature and the temperature of the second area approaches the second temperature.

14. The air conditioner according to claim 7, further comprising:

a remote controller arranged so as to be communicable with the electronic controller, the remote controller including the setting unit, the setting unit is configured to set values input by a user as the first temperature and the second temperature.

15. A learning device that continuously performs learning for a control of an air conditioner including a plurality of user-side devices in a room, each of the user-side devices including a heat exchanger, by receiving a learning data set, to adjust a temperature of a first area in the room to a first temperature, the first temperature being a target temperature for the first area, and to adjust a temperature of a second area in the room to a second temperature, the second temperature being a target temperature for the second area, the learning data set including wind direction data regarding a blowing-out direction of air blown-out from the plurality of user-side devices of the air conditioner, refrigerant data regarding a temperature of the air blown-out from the plurality of user-side devices of the air conditioner, air volume data regarding an air volume of the air blown-out from the plurality of user-side devices of the air conditioner, and area data regarding air temperatures of the first area and the second area, the wind direction data, the refrigerant data and the air volume data being operation data of the plurality of the user side devices in the room, the learning device being configured to control each of the plurality of user-side devices of the air conditioner in accordance with the learning.

* * * * *